United States Patent
Conlan et al.

(10) Patent No.: US 8,799,988 B2
(45) Date of Patent: Aug. 5, 2014

(54) DOCUMENT COMMUNICATION RUNTIME INTERFACES

(75) Inventors: Patrick Conlan, Seattle, WA (US); Bryan Reich, Snoqualmie, WA (US); Jiajun Hua, Redmond, WA (US); Zhenyu Tang, Sammamish, WA (US); Robert Gavrila, Redmond, WA (US); Alexandru Croicu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 13/358,383

(22) Filed: Jan. 25, 2012

(65) Prior Publication Data

US 2013/0191880 A1    Jul. 25, 2013

(51) Int. Cl.
*G06F 21/22*    (2006.01)

(52) U.S. Cl.
USPC .................................... 726/1; 726/23

(58) Field of Classification Search
CPC ... G06F 21/00; G06F 21/53; G06F 17/30958; H04L 63/168
See application file for complete search history.

(56) References Cited

U.S. PATENT DOCUMENTS

| | | | |
|---|---|---|---|
| 6,122,073 A * | 9/2000 | Miyasaka et al. | 358/434 |
| 7,054,952 B1 | 5/2006 | Schwerdtfeger et al. | |
| 2005/0177635 A1* | 8/2005 | Schmidt et al. | 709/226 |
| 2007/0299857 A1* | 12/2007 | Gwozdz et al. | 707/102 |
| 2010/0138316 A1* | 6/2010 | Connors et al. | 705/27 |
| 2010/0281107 A1* | 11/2010 | Fallows et al. | 709/203 |
| 2011/0138473 A1 | 6/2011 | Yee et al. | |
| 2011/0154130 A1 | 6/2011 | Helander et al. | |
| 2011/0246772 A1 | 10/2011 | O'Connor et al. | |
| 2011/0292072 A1 | 12/2011 | Fisher et al. | |

OTHER PUBLICATIONS

Adam Barth et al. "Securing Frame Communication in Browsers" Jul. 28 Aug. 1, 2008. pp. 1-7 10-12.*
"International Search Report", Mailed Date: Apr. 30, 2013, Application No. PCT/US2013/022006, Filed Date: Jan. 18, 2013, pp. 10.
Barth, et al., "Securing Frame Communication in Browsers", Retrieved at <<http://seclab.stanford.edu/websec/frames/post-message.pdf>>, In Proceedings of the 17th USENIX Security Symposium, Jul. 28, 2008-Aug. 1, 2008, pp. 14.
Jana, et al., "TxBox: Building Secure, Efficient Sandboxes with System Transactions", Retrieved at <<http://ieeexplore.ieee.org/stamp/stamp.jsp?tp=&arnumber=5958038>>, IEEE Symposium on Security and Privacy (SP), Jul. 18, 2011, pp. 329-344.

(Continued)

*Primary Examiner* — Jung Kim
*Assistant Examiner* — Ghodrat Jamshidi
(74) *Attorney, Agent, or Firm* — Tom Wong; Jim Ross; Micky Minhas

(57) ABSTRACT

A set of protocols support a common script object model for document interaction that crosses document types and runtime environments. A cross frame browser-based protocol may provide a secure, scalable, and asynchronous mechanism for transmitting script object model requests to document hosts and managing responses to developer code in standards-compliant browsers. A hostable runtime Application Programming Interface (API) may provide a secure, scalable, and asynchronous protocol to transmit script object model requests across process boundaries to document hosts back to developer code with minimum performance impact on the document host.

18 Claims, 9 Drawing Sheets

(56) References Cited

OTHER PUBLICATIONS

Dutta, Sunava, "An Introduction to Cross-Document Messaging in Internet Explorer 8", Retrieved at <<http://msdn.microsoft.com/en-us/library/cc511311(v=VS.85).aspx>>, May 2008, pp. 5.

Jackson, et al., "Subspace: Secure CrossDomain Communication for Web Mashups", Retrieved at <<http://www.collinjackson.com/research/papers/fp801-jackson.pdf>>, International World Wide Web Conference Committee, May 8-12, 2007, pp. 10.

Reis, Charles, "Improving the Security and Robustness of Modern Web Browsers", Retrieved at <<http://citeseerx.ist.psu.edu/viewdoc/download?doi=10.1.1.112.2006&rep=rep1&type=pdf>>, University of Washington, 2007, pp. 1-15.

Kinsey, Sean, "Cross-Document Messaging and RPC", Retrieved at <<http://msdn.microsoft.com/en-us/scriptjunkie/ff800814>>, Jun. 29, 2010, pp. 8.

"Chapter 27: Designing Office Business Applications", Retrieved at <<http://msdn.microsoft.com/en-us/library/ee658085.aspx>>, Retrieved Date: Nov. 16, 2011, pp. 15.

\* cited by examiner

DOCUMENT COMMUNICATION RUNTIME INTERFACES

BACKGROUND

With the proliferation of computing and networking technologies an increasing number of applications such as productivity applications providing word processing, spreadsheet, presentation, communication, and similar services are provided in browser based form in addition or in place of locally installed versions.

Browser-based applications can be categorized as mashup web applications, where a web page combines content from multiple sources. For example, in a productivity application scenario, the hosting page may be coming from a collaborative service server with an embedded web access component coming from a web access server and a business service extension component coming from a business service or a third party's extension component server. In this context, the hosting page is the integrator and the web access and extension components are gadgets in mashup terms. In such a model, the gadgets may not be fully trusted. A widely adapted solution is to use iframe to sandbox the component(s) and rely on the browser's Same Origin Policy (SOP) scripting policy to prevent one gadget from harming others' data.

However, with iframe as sandbox and SOP as security guard, interactions between trusted extension components and web access components may be limited. Thus, communication channels established between trusted frames may not be both secure and reliable for application isolation in browser-based systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a set of protocols to support a common script object model for document interaction that crosses document types and runtime environments. According to some embodiments, a cross frame browser-based protocol may provide a secure, scalable, and asynchronous mechanism for transmitting script object model requests to document hosts and managing responses to developer code in standards-compliant browsers. According to other embodiments, a hostable runtime Application Programming Interface (API) may provide a secure, scalable, and asynchronous protocol to transmit script object model requests across process boundaries to document hosts back to developer code with minimum performance impact on the document host.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
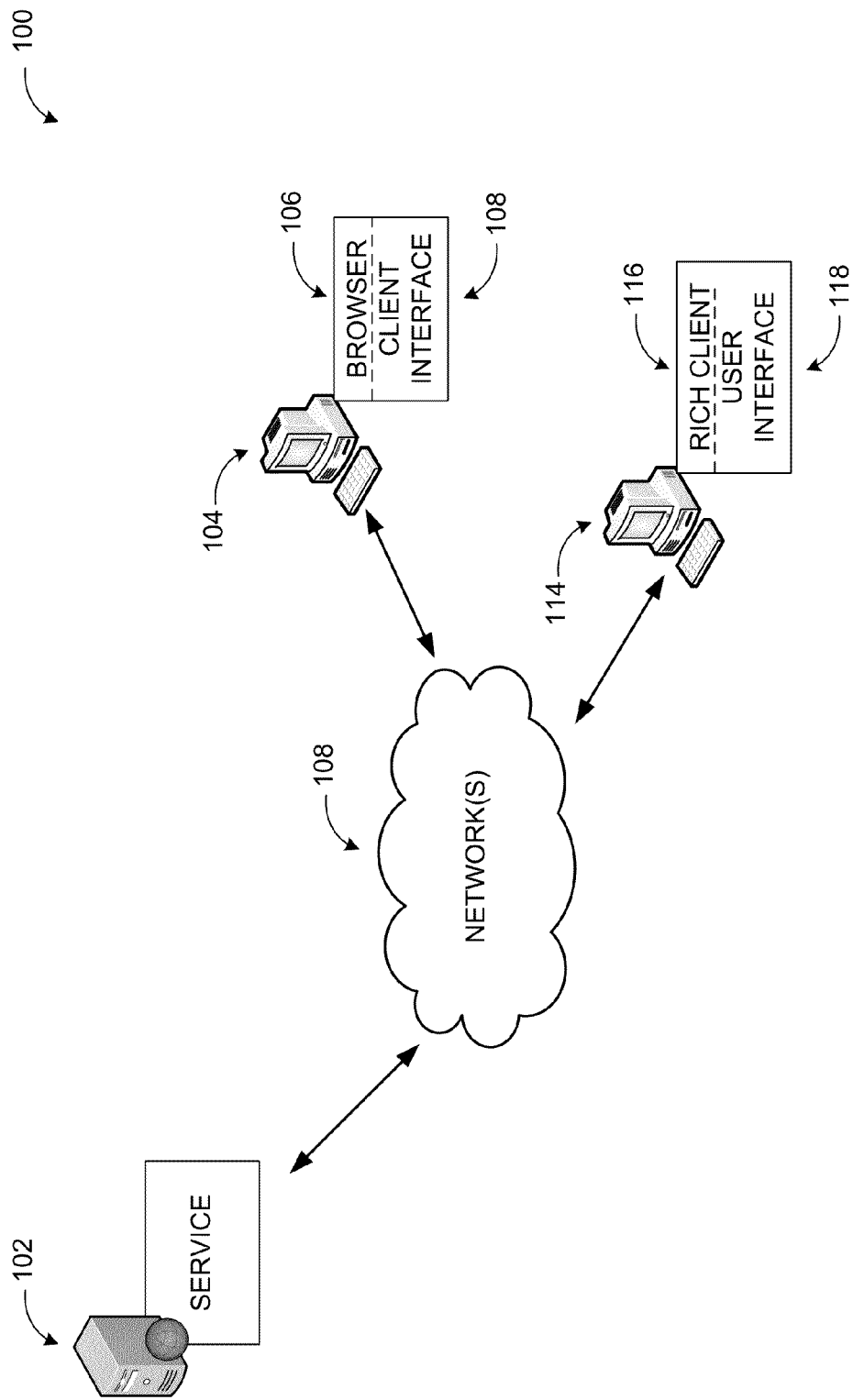
FIG. 1 illustrates a networked environment, where document communication interfaces according to some embodiments may be implemented.

As briefly described above document interaction across different document types and runtime environments for browser-based and rich client applications may be facilitated through a cross frame browser-based protocol and a hostable runtime Application Programming Interface (API) providing a secure, scalable, and asynchronous mechanism for transmitting script object model requests to document hosts and managing responses to developer code in standards-compliant browsers. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing web-based services such as productivity applications or similar ones. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices (hardware) viewed as a server on the network. More detail on these technologies and example operations is provided below.

Referring to FIG. 1, diagram 100 illustrates a networked environment, where document communication interfaces according to some embodiments may be implemented. The computing devices and computing environments shown in diagram 100 are for illustration purposes. Embodiments may be implemented in various local, networked, and similar computing environments employing a variety of computing devices and systems.

In an example environment illustrated in diagram 100, service 102 (e.g., a cloud-based service) may provide one or more applications and associated services to a plurality of clients over one or more networks 108. Users may access the services (and applications) through thin client applications such as browser application 106 executed on a computing device 104 or through rich client applications such as rich client application 116 executed on computing device 114. Thin client applications are typically generic applications that enable access to a plurality of services through communication with a service and rendering service-provided elements through a client interface 108. While thin client applications may store some data locally and have some user specific or service specific configurations, they are generally not dedicated to a particular service or client. For example, a user may access the same services through any thin client application on any computing device (implementing suitable security measures). On the other hand, rich client applications typically involve locally installed applications that have user specific and/or service specific configurations. A portion of the data and configurations may be stored locally. A rich client is also commonly device specific (due to installation and configuration aspects).

An example of service 102 is a productivity service providing functionality such as word processing, spreadsheet, presentation, email/text message communication, scheduling, contact management, and similar tasks. Microsoft Office® by Microsoft Corporation of Redmond, Wash. is one example productivity suite. Embodiments are not limited to productivity services. Other service such as business services, testing services, and comparable ones may also be implemented using the principles described herein.

In web-based services, developers write code against a public interface called a script object model. A system according to embodiments addresses the performant translation and secure transmission of requests from this interface to the application hosting a document. Some applications implement "in process" and are tightly coupled to the application leading to difficulty in providing a common programming model as well as process isolation issues and security issues. Moreover, isolation may be employed, where one channel is not aware of another channel and cannot access/interfere with its data, to prevent elevation of privilege by a web extension with limited privileges running with a high privilege extension.

Embodiments may be implemented with rich clients or browsers (employing iframe and cross-document messaging technologies). Both support script object model with a secure, performant, asynchronous, and isolated protocol for retrieving and updating data. In rich client applications, a IDispatch based Application Programming Interface (API) that marshals data between the runtime environment (where the script object model is executed) and the rich client application (where the data is managed and presented to the user). Thus, the cross-process transfer of data to and from the script runtime environment and the rich client application is managed.

A background thread in the rich client application that manages the interaction with the runtime environment (queuing requests and interacting with a foreground user interface thread) may be provided. This architecture may ensure that the extensibility runtime environment has managed performance impact on the rich client application. Thus, the rich client application's implementation of the API applies instructions from extensibility code to the document data.

Also in rich client application implementations, a runtime environment may be provided that implements the IDispatch API connecting the runtime environment to a web browser control hosted inside a browser application. Thus, process isolation ("sandboxing") and thread management (to support multiple concurrently active extensions) may be provided. While references are made to IDisptach API in the example descriptions throughout this disclosure, that particular interface is not required to be used in embodiments. Any explicitly defined interface may be employed as well. For example, a proprietary sandboxing process may be defined and the web browser control hosted internal to it. Alternatively, a standard web browser may host the control as a custom protocol handler.

Browser-based applications (e.g., Excel Web Services® and Outlook Web Access® by Microsoft Corporation of Redmond, Wash.) may be constrained by the capabilities of the browser. When running extension code, there may be access restrictions applied when the code does not originate from the same domain as the data. When the code originates from the same domain, there may still be issues with enforcing access controls. Embodiments implementing browser-based services may provide a secure and performant protocol to enable these constraints to be removed delivering a cross-document messaging based API that securely marshals requests between the iframe hosting the runtime environment (the script object model) and the iframe/page hosting the document. Iframe communication is a managed type of intra-process communication within the browser object. There is a cross-process boundary that goes from the browser "Extension Web Component" to the host via COM or via another marshaling process, or from the browser to the WAC server in server embodiments via network protocols.

Browser-based implementation may include a requestor (the part of the runtime hosted by the extension developer's iframe) and a listener (the part of the runtime hosted in the document container that services requestor requests. There may also be a queuing system that is designed to ensure that the extension is serviced fairly with other extensions.

Browser-based applications can be categorized as mashup web applications, where a web page combines content from multiple sources with the hosting page being the integrator and the web access and extension components being the gadgets in mashup terms. A mashup web page or application that uses and combines data, presentation, or functionality from two or more sources to create new services aims for easy, fast integration, in producing enriched results that are not necessarily the original reason for producing the raw source data. The main characteristics of the mashup are combination, visualization, and aggregation.

Figure 2:
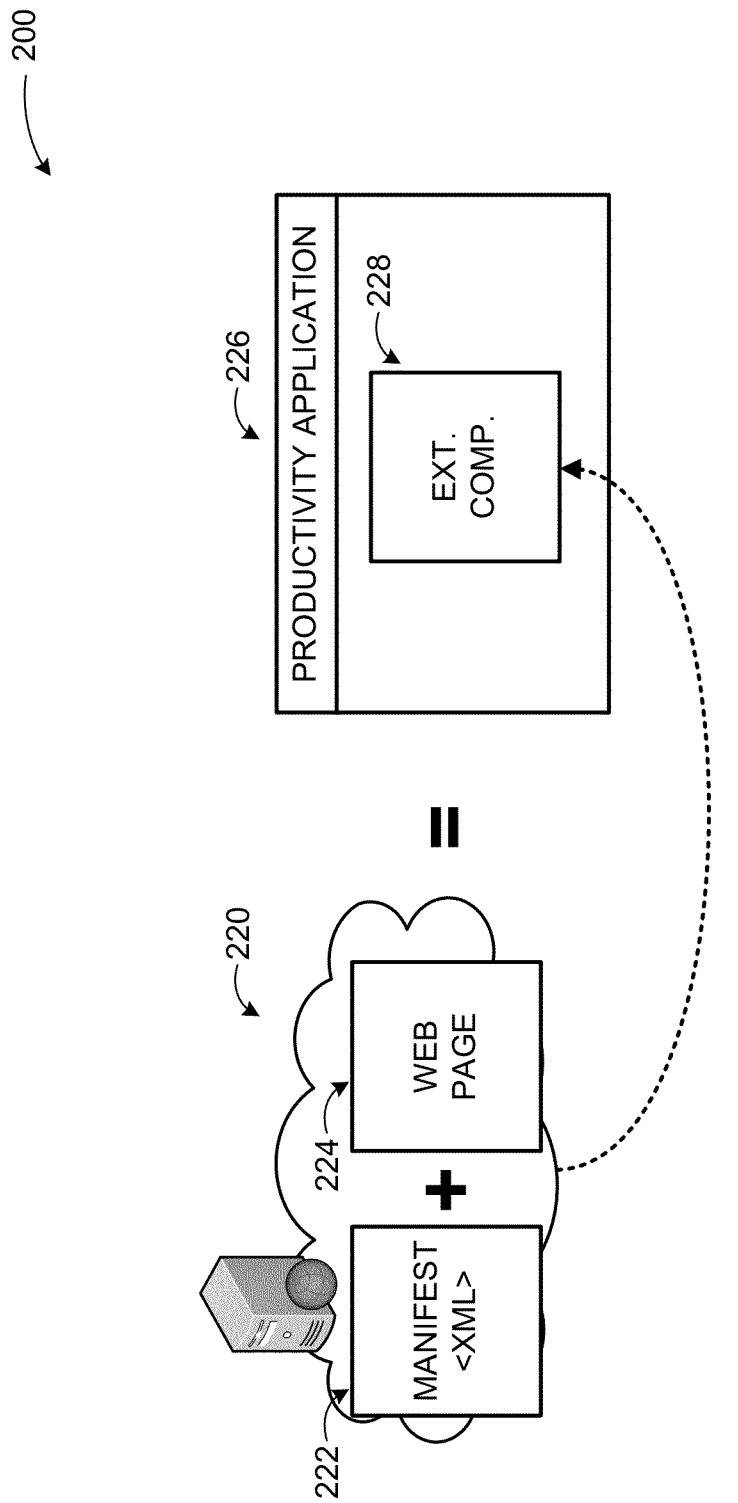
FIG. 2 illustrates a top level overview of an example system.

FIG. 2 illustrates a top level overview of an example system.

As shown in diagram 200 a hosted service 220 (e.g., a cloud-based service) may combine manifest 222 (for example, in extensible markup language "XML") and web page 224. Manifest file 222 may provide information associated with an instance of the application, document content type, and document content. An extension component 228 hosted by productivity application 226 may provide web object control, a browser environment that is coupled to the data and event layers to provide developers with a mechanism to interact with the productivity client. Data calls from the service 220 may be actually data calls in a sandbox where they are filtered via a policy and translated into productivity client data calls via a host integration manager. In a system according to embodiments, there are two distinct APIs. First is the script API that the solution script sees. The second is the actual cross-process API the host exposes that the script wraps for the developer. The script API that the solution sees may be optional, and the policy may be enforced in the cross-process API as discussed in more detail below.

Thus, embodiments are directed to secure, scalable, and document-centric inter-frame communications. A policy checking mechanism is also provided over Remote Procedure Call (RPC) based messaging, where the recipient checks if the sender is allowed to make a call. Frame-to-frame communication may use multiple channels without interference. Thus, different calls may be made simultaneously. A user interface component enables HTML code to be rendered to a user. RPC is specifically inter-process and not intra-process. The RPC calls may be considered as the calls from framework iframe via networking APIs to the server or marshaled calls made via COM or other marshaling technology from the browser to the host.

Figure 3:
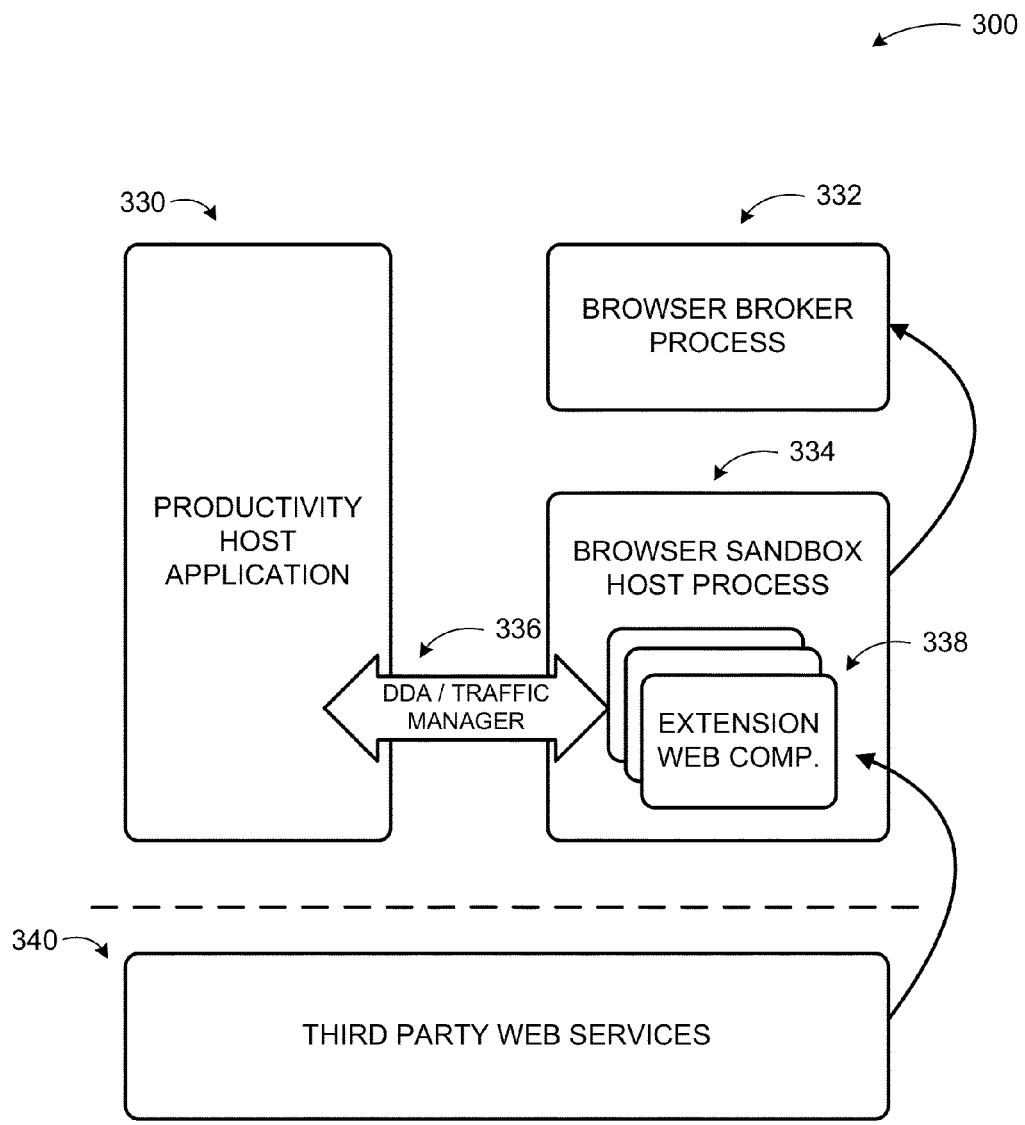
FIG. 3 illustrates example interactions between processes for a rich client in a system according to embodiments.

FIG. 3 illustrates example interactions between processes for a rich client in a system according to embodiments. A browser implementation may leverage iframes.

Diagram 300 shows an example architecture, where third party web services 340 provide extension content (script language, HTML, etc.) to a browser sandbox host process 334. According to some embodiments, a runtime environment may implement an API connecting it to a control hosted inside the browser and providing process isolation ("sandboxing") and thread management to support multiple concurrently active extensions. The browser sandbox host process 334 may be a low integrity level (IL) process and submit requests needing medium IL access to a medium IL browser broker process 332.

Integrity levels (ILs) are part of a core security feature implemented in operating systems that add IL-based isolation to processes running in a login session. ILs are used to selectively restrict access permissions of certain programs or software components in contexts that are considered to be potentially less trustworthy, compared with other contexts running under the same user account that are more trusted. A subject IL may be assigned to a security access token when an object is initialized. The integrity level in the access token is compared against the integrity level in the security descriptor when the security reference monitor performs authorization before granting access to objects. The operating system (or host process) may restrict allowed access rights depending on whether the subject's integrity level is higher or lower than the object and depending on the integrity policy flags.

An IDispatch based API may manage data traffic between the runtime environment and the productivity host application 330 where the data is managed and presented to the user. Document Data Access (DDA)/traffic manager 336 may manage the cross-process transfer of data to and from the script runtime environment (extension web components 338) and the productivity application.

Figure 4:
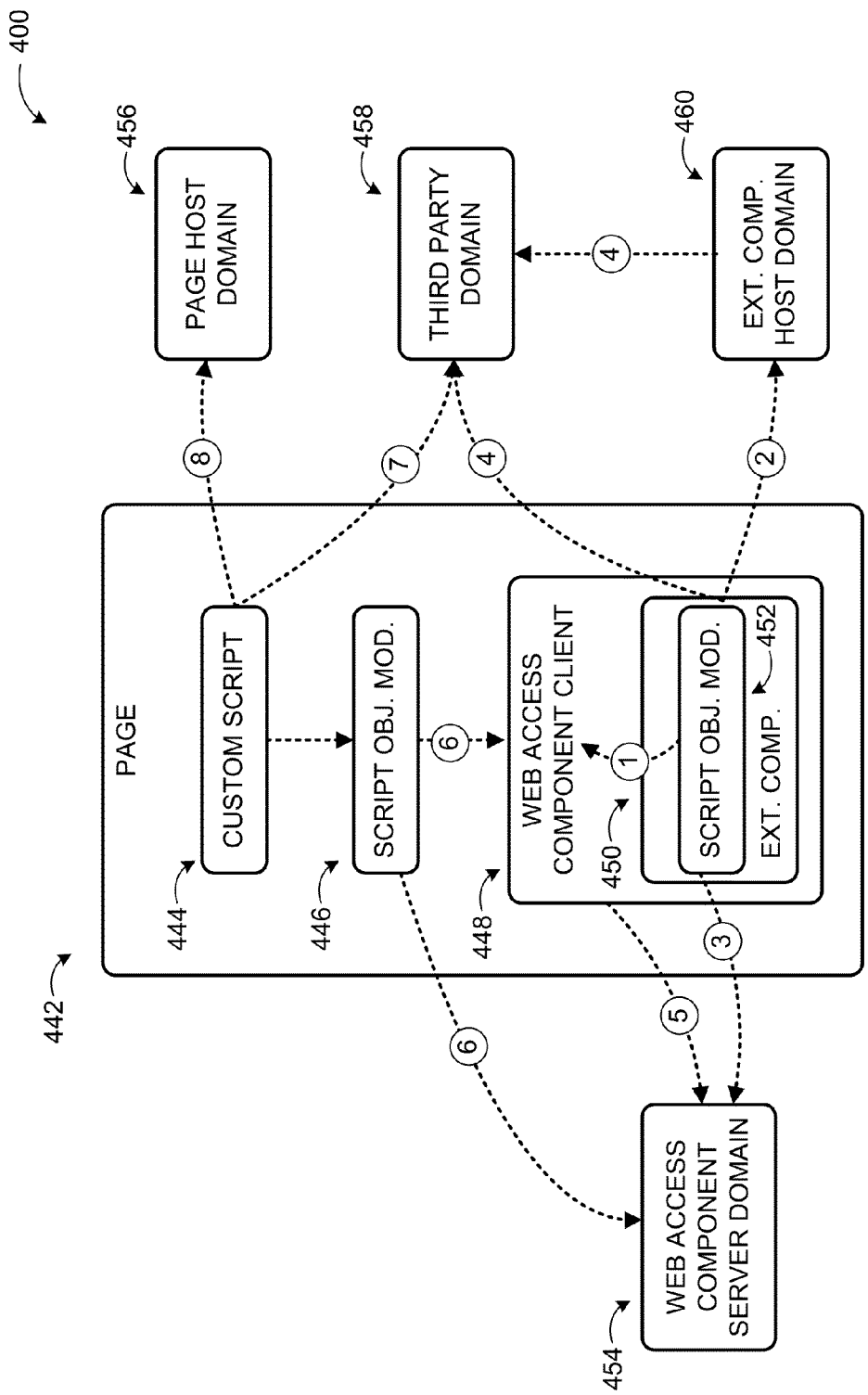
FIG. 4 illustrates an example of facilitating cross-domain access through to document data in a browser-based implementation.

FIG. 4 illustrates an example of facilitating cross-domain access through to document data in a browser-based implementation. The example components interacting in diagram 400 include page 442 with custom script 444, script object model 446, and web access component client 448, which may include an extension component 450 with its script object model 452. Other components represented in diagram 400 include web access component server domain 454, page host domain 456, third party domain 458, and extension component host domain 460.

Extension document access (1) is the key flow for the extension developer—e.g., their code is loaded onto the page, "into" the web access component (WAC) that hosts the extensions document and they want to read (and potentially write) to the document. In a conventional system, the developer cannot call WAC web services and because they are hosted in an HTML iframe and the browser same origin policy (SOP) prevents direct interaction with the rest of the page. Access is controlled by the WAC server control which can enforce policy-based controls. Interaction (2) represents extension access to own extension component host domain. The extension is loaded from this domain and can interact with this domain without restriction, for example to load pictures, update forms and interact with web services. The extension user may be made aware that any data they enter into the extension, or allow to flow to the extension through the API can be sent to this domain.

Interaction (3) represents extension access to WAC server domain. The document page content is loaded from this domain through the WAC control, which includes the iframe that hosts the extension. The extension code has no direct access to this domain and cannot invoke its web services, which may only be accessed by the hosting WAC iframe on its behalf. Extension access to other domains (4) may be possible through a proxy. Examples of proxy models may include a page proxy, an extension component domain proxy, or a document domain proxy. In the page proxy, any iframe on the page may host an xdm-based proxy that responds to authorized messages. The developer may also build and leverage a proxy on their own domain to provide onward access to other domains as they require, providing service for their application. The document domain proxy may be accessed using xdm services on the page and can provide controlled and authenticated access to third party domains.

The web access component code may interact (5) with the document through WAC access to WAC domain. The WAC code is not directly extensible and controls may be provided to prevent unsafe hosting (frame-busting).

Because of Same Origin rule, browser-side code running on the page that is hosting the WAC controls may not be able to access the WAC services directly, however they can leverage the API to interact (6) with the document. The API may be callable from both inner and outer frames. Page access to other domains (7) may be facilitated as in (4), where the page is restricted in the domains it can access directly and has to leverage similar proxy technologies to invoke web services. Page access to own page host domain (8) may be enabled as a means of building rich collaborative applications.

Figure 5:
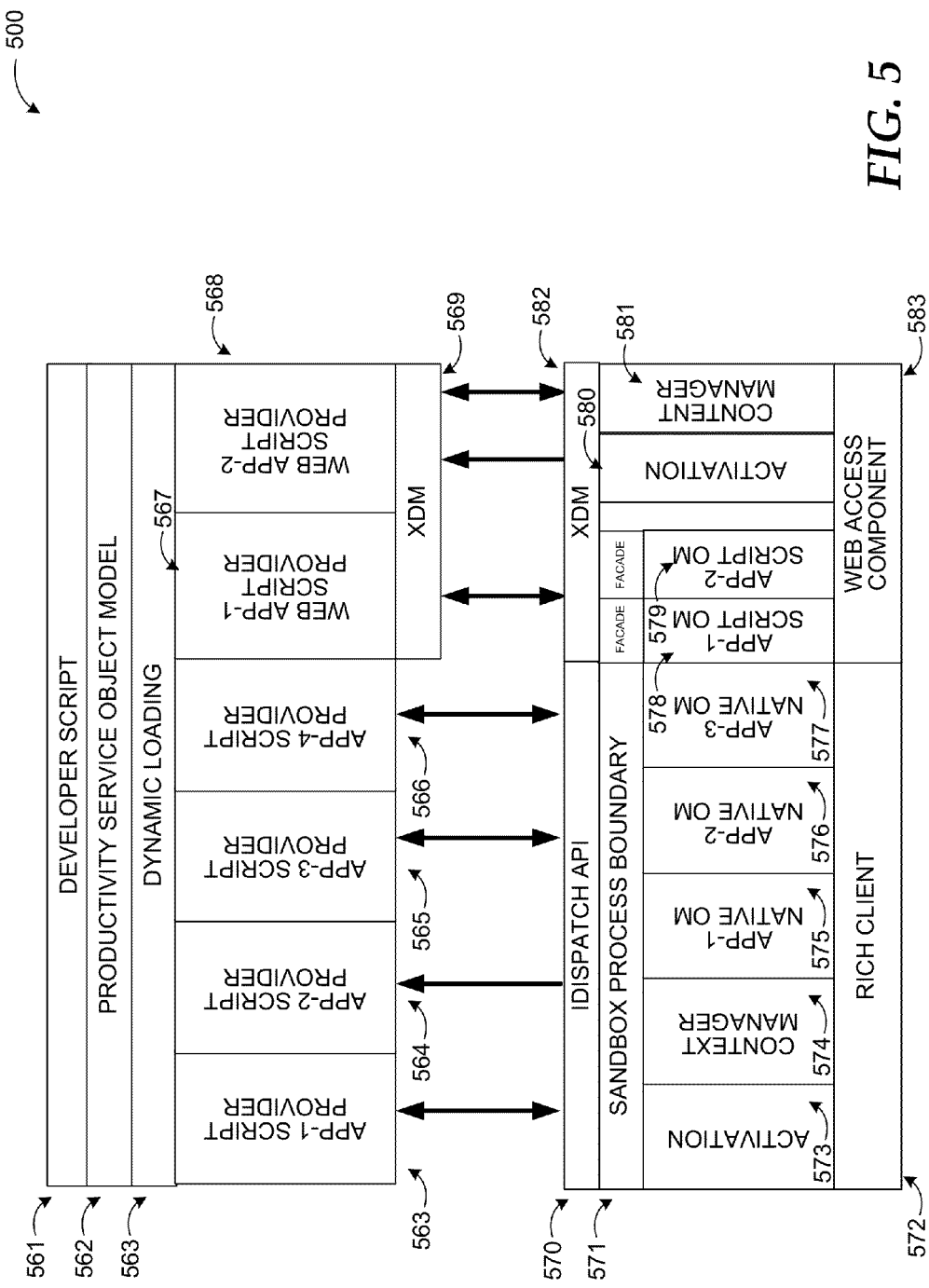
FIG. 5 illustrates example browser and rich client implementations of document communication runtime interfaces according to embodiments.

FIG. 5 illustrates example browser and rich client implementations of document communication runtime interfaces according to embodiments. The browser (xdm) and rich client (IDispatch) implementations interact across domain boundaries.

Developer script 561 is translated through productivity service object model 562 and dynamic loading 563 by a solution framework provider manager forming the productivity script. Application specific script code may be provided by individual application script providers or web application script providers (563 through 568). Application script providers and web application script providers are optional layers that may be provided as a convenience to developers. The individual applications in a productivity service example may include spreadsheet applications, word processing applications, presentation applications, and so on. Interaction between the application specific scripts of the web application providers and web access component 583 may be facilitated through xdm interfaces 569 and 580 on either side of the cross-domain boundary. The components on the runtime environment side (within web access component 583) include application script object models 578-579, an activation component 580, and a context manager component 581.

On the rich client (572) side, the IDispatch API 570 facilitates marshaling of messages through the sandbox process boundary 571 to activation component 573, context manager component 574, and native application object models 575-577.

Figure 6:
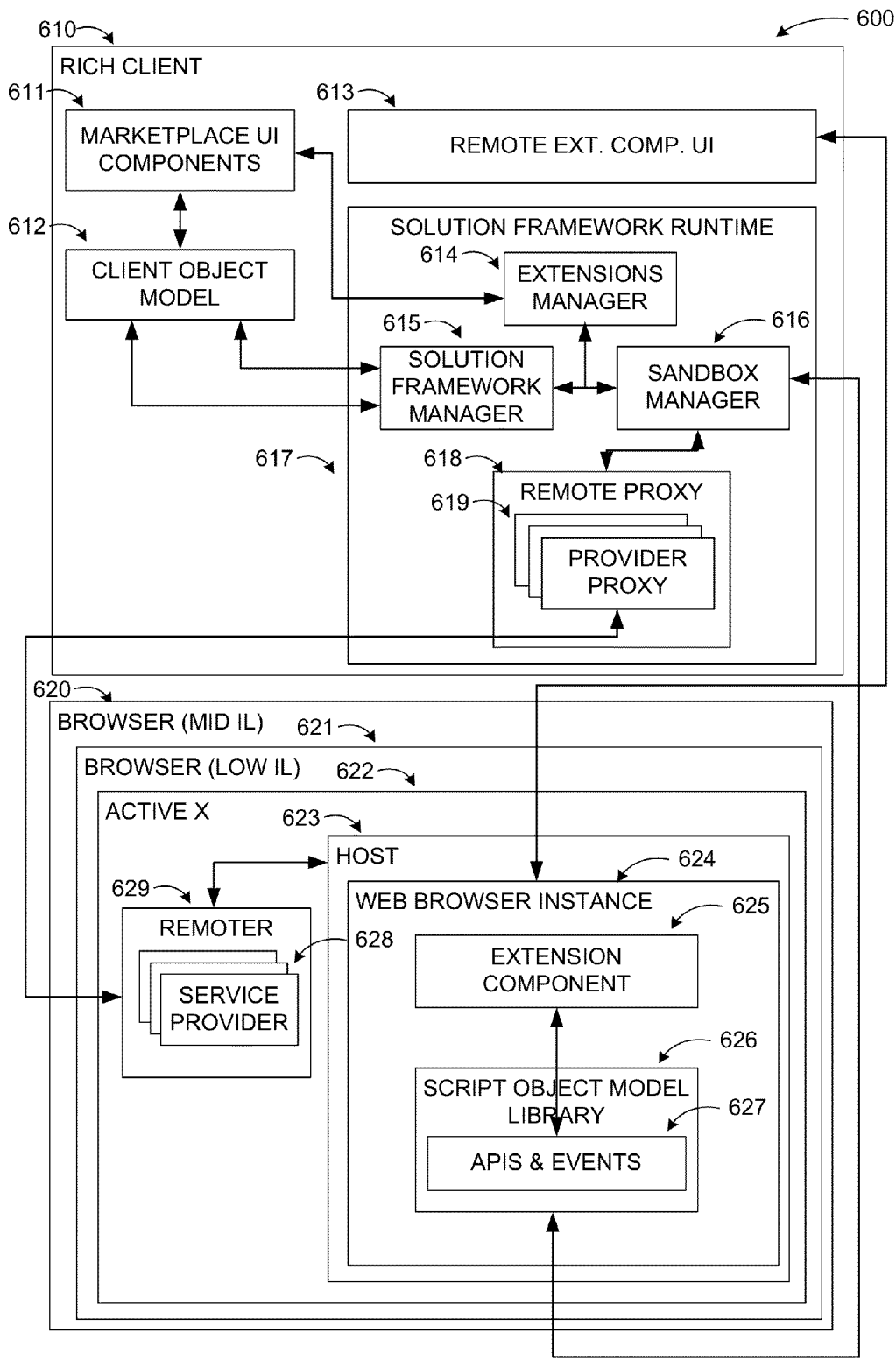
FIG. 6 illustrates example component relationships in a rich client implementation.

FIG. 6 illustrates example component relationships in a rich client implementation.

Rich client application 610 may include marketplace user interface components 611, which may interact directly with an extension manager 614 in solution framework runtime environment 617 and through client object model 612 with a solution framework manager 615. At solution framework runtime, a sandbox manager 616 may also be executed in addition to the other manager modules interacting with a script object model library at browser 620. Service providers 628 may interact with sandbox manager 616 through provider proxies 619 at remote proxy 618 within the solution framework runtime environment 617. Rich client 610 may also include remote extension component user interface 613 interacting with web browser instance 624 at the browser 620.

The browser may be divided into two layers: a medium IL layer (620) and a low IL layer 621. Remoter 629 with service providers 628 may be within an Active X layer 622 along with process host 623. The process host 623 may include web browser instance 624 with an extension component 625 (application specific) and script object model library 626 that includes APIs and events 627.

In a system according to embodiments, each application may have a separate process host 623. This avoids complexity when starting/stopping the host as it can check the process list and shutdown if its "owner" has gone away. A single process host can cope with the number of extensions that may be open at one time per application. Each extension may be served by a dedicated web object control and a number of communication protocols may be employed.

A set of layered components with clear interfaces may be established within each process host and between the owning application host and the sandbox process to enable managed delivery and clear debugging of the infrastructure. Within the application, persistence may be achieved by a per extension instantiation property group containing instance specific state that may be persisted inline to the document. A host integration manager may contain the code specific to each application mapping the application capabilities to the sandbox. A context and activation manager may bridge solutions to the host data and manage each extension's context. This layer may handle application event translation and forwarding as well as servicing requests for data from extensions. Embodiments also provide for rule-based activation. Rules may be specified for activation that control when an extension is made available and provide information via that evaluation to the extension for data that matches the specified rules. Embodiments also provide for the governance of the sandboxed process as far as resource consumption (processor, memory, etc.) are concerned. Aspects of the external process may be monitored and the extension stopped or restarted based on violations of predefined metrics in client implementations.

A solution manager may determine which extensions relate to the instance of the application, document content type, and document content, and obtain configuration and policy information from the manifest files cached on the user machine. A sandbox manager may be the governing code for the sandbox process host periodically checking that the application is still active and controlling the web browsers hosting extensions.

The code in the application may handle host sandbox process and extension activation leveraging multiple communication protocols. The protocols allow communication between the application and the sandbox host. The flow may start with activation in the application host, flow back with data requests from the extensions in the web object controls and returns on events fired within the application.

The sandbox host process may be similarly layered. A policy manager may receive the policy information read from the extension manifest by the solution manager when starting an extension and use this to control access to service providers. The scrip object model API may be an endpoint that services data requests from extensions. The implementation may remote those requests through the service providers and proxies as discussed above. An events layer may fan out framework events that have been sent from the host integration manager enabling event payload without marshaling duplication. Web object control(s) are the instances of each extension, a browser environment that is coupled to the data and event layers to provide developers with a mechanism to interact with the document (and the application).

The example scenarios, architectures, and schemas in FIG. 1 through 6 are shown with specific components, data types, and configurations. Embodiments are not limited to systems according to these example configurations. Document communication runtime interfaces may be implemented in configurations employing fewer or additional components in applications and user interfaces. Furthermore, the example schema and components shown in FIG. 1 through 6 and their subcomponents may be implemented in a similar manner with other values using the principles described herein.

Figure 7:
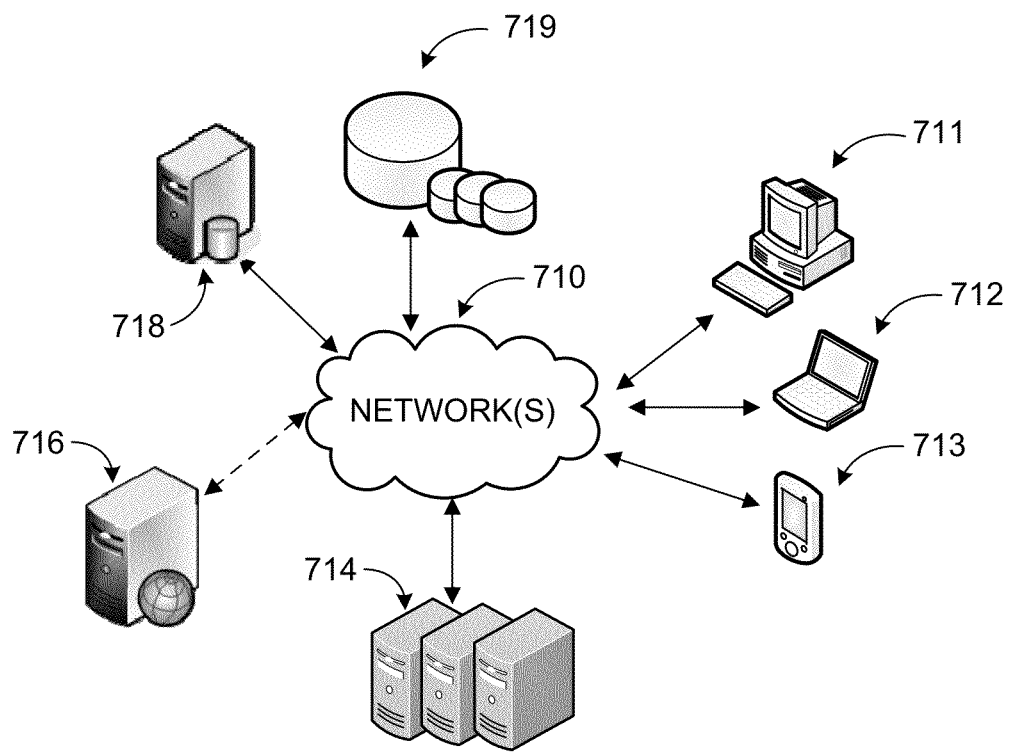
FIG. 7 is a networked environment, where a system according to embodiments may be implemented.

FIG. 7 is a networked environment, where a system according to embodiments may be implemented. A system employing a cross frame browser-based protocol and a hostable runtime API providing a secure, scalable, and asynchronous cross-frame browser-based mechanism for transmitting script object model requests across process boundaries to document hosts, managing responses to developer code in standards-compliant browsers with minimum performance impact on the document host may be implemented over one or more servers 714 or a single server (e.g. web server) 716 such as a hosted service. Such a service may communicate with client interfaces on individual computing devices such as a smart phone 713, a laptop computer 712, or desktop computer 711 ('client devices') through network(s) 710.

As discussed above, the service may enable secure and scalable document-centric communication across frames for browser-based applications such as productivity applications. Client devices 711-713 may enable access to applications executed on remote server(s) (e.g. one of servers 714) as discussed previously. The server(s) may retrieve or store relevant data from/to data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media. The service executed over one or more servers may also be a cloud-based service.

Many other configurations of computing devices, applications, data sources, and data distribution systems may be employed to manage document communication runtime interfaces. Furthermore, the networked environments discussed in FIG. 7 are for illustration purposes only. Embodiments are not limited to the example applications, modules, or processes.

Figure 8:
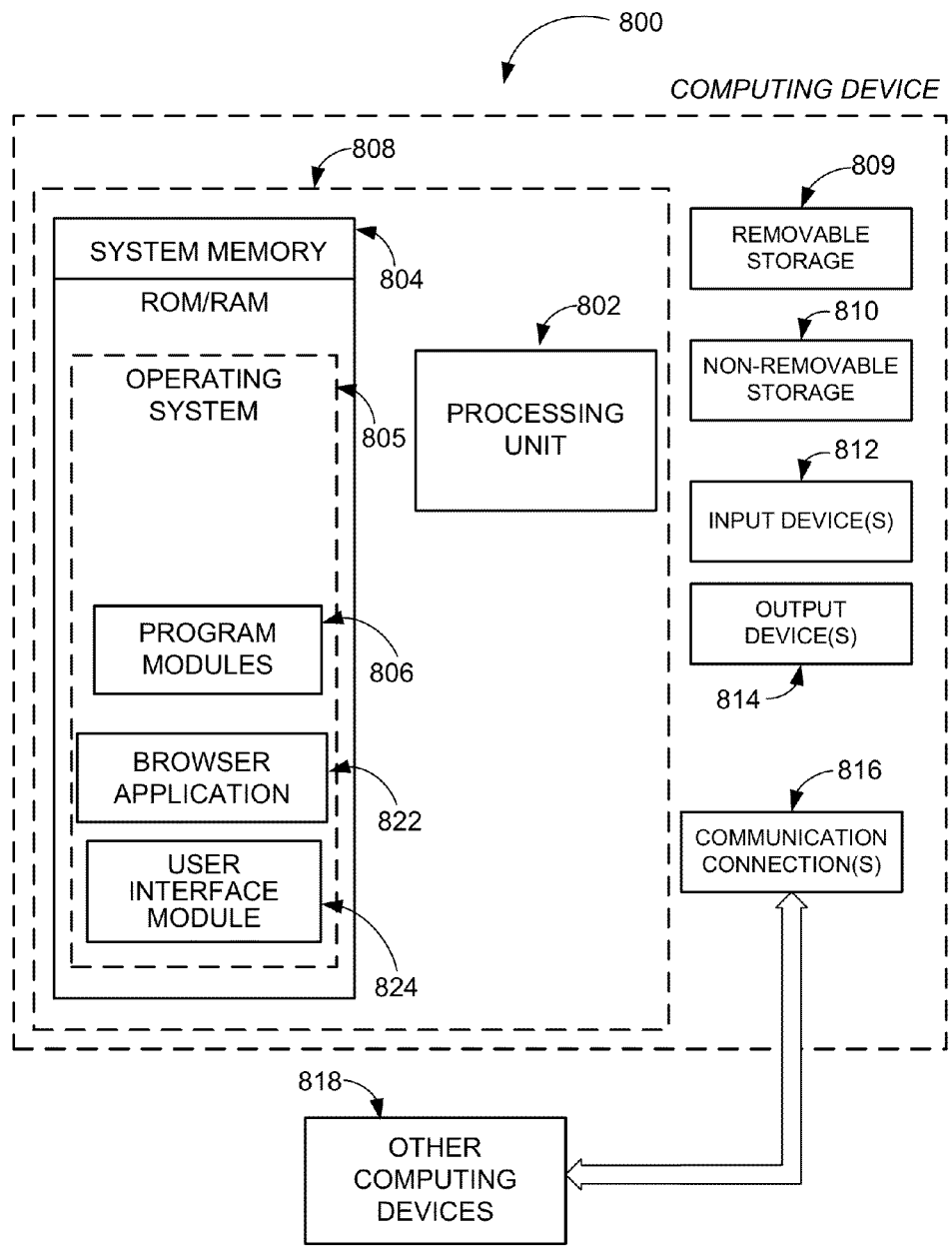
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, browser application 822, and user interface component 824.

Browser application 822 may provide access to a hosted service such as a productivity service with multiple services such as word processing, spreadsheet, presentation, communication, and comparable ones. User interface component 824 may enable rendering of HTML code to a user from different sources. In rendering documents and providing document related services, multiple secure channels may be used between frames for cross-domain messaging. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, storage servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 9:
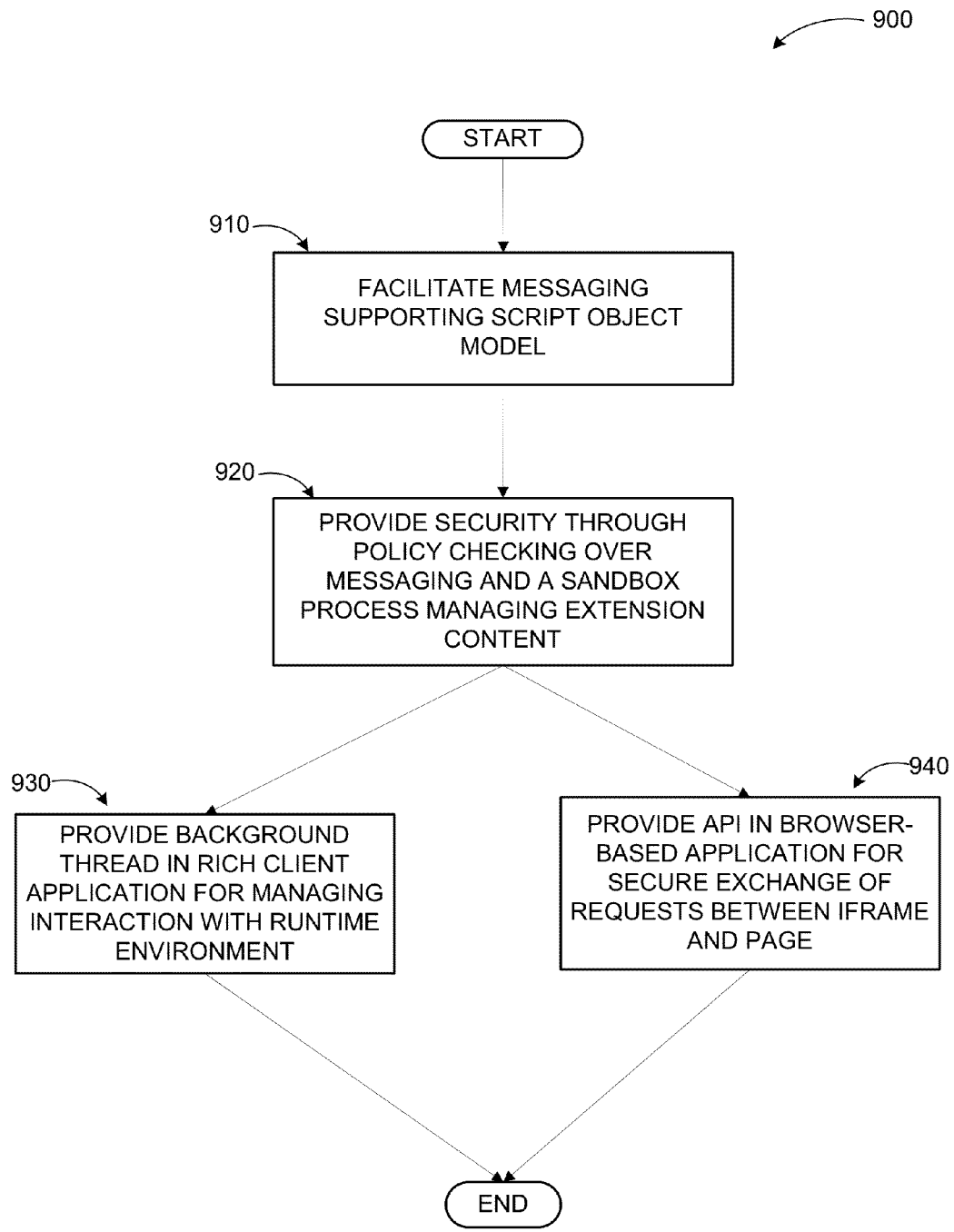
FIG. 9 illustrates a logic flow diagram for a process facilitating document communication through runtime interfaces according to embodiments.

FIG. 9 illustrates a logic flow diagram for a process facilitating document communication through runtime interfaces according to embodiments. Process 900 may be implemented by a hosted service in some examples.

Process 900 may begin with operation 910, where document-centric messaging is facilitated for transmitting calls supporting a script object model. Messaging may be cross-frame for browser implementations and through an IDispatch interface for rich client implementations. At operation 920, security may be provided through a policy checking mechanism over the cross-frame messaging, where a receiving entity confirms whether a transmitting entity is allowed to transmit a call, and/or through employing a sandbox process to manage extension content traffic between an application hosting a document and third party web services providing the extension content.

At operation 930, a background thread may be provided in a rich client application for managing an interaction with a runtime environment by queuing requests and interacting with a foreground user interface thread. At operation 940, a cross-document messaging based API may be provided in a browser-based application that securely exchanges requests between an iframe hosting the runtime environment and an iframe or a page hosting a document.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones. In some embodiments, two-way error handling may be enabled across the mechanism. For example, a host application may signal an error back to a runtime instance (such as a permissions issue) and the runtime instance may send an error to the host application (such as a resource exhaustion message).

The operations included in process 900 are for illustration purposes. Document communication runtime interfaces may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing document communication runtime interfaces, the method comprising:
   facilitating document-centric messaging for transmitting calls supporting a script object model;
   providing security employing at least one of a policy checking mechanism over the messaging, wherein a receiving entity confirms whether a transmitting entity is allowed to transmit a call, and a sandbox process to manage extension content traffic between an application hosting a document and third party web services providing the extension content;
   providing a solution manager to determine which extensions relate to an instance of the application, a document content type, and document content, and to obtain configuration and policy information from manifest files cached on a user machine;
   monitoring aspects of the extensions; and
   one of stopping and restarting the extensions based on violations of predefined metrics.

2. The method of claim 1, further comprising:
   employing Remote Procedure Call (RPC) protocol for the messaging; and
   enabling use of a plurality of channels for the communication such that multiple cross-domain calls can be transmitted simultaneously.

3. The method of claim 1, further comprising:
   enabling two-way error handling between a host application and a runtime environment.

4. The method of claim 1, further comprising:
   providing a hostable runtime Application Programming Interface (API) for secure, scalable, and asynchronous transmission of script object model requests across process boundaries.

5. The method of claim 4, wherein the script object model requests are transmitted between a document host and developer code with a substantially reduced performance impact on the document host, and the API applies instructions from extensibility code to document data.

6. The method of claim 1, further comprising:
   enabling specification of one or more rules for controlling when an extension is to be made available and for providing information via evaluation to the extension for data that matches the specified rules.

7. The method of claim 1, further comprising:
   providing a background thread in a rich client application for managing an interaction with a runtime environment by queuing requests and interacting with a foreground user interface thread.

8. The method of claim 7, wherein thread management is employed to support multiple concurrently active extensions.

9. The method of claim 7, further comprising:
   providing an API connecting the runtime environment to a browser control.

10. The method of claim 1, further comprising:
    in a browser-based application, providing a cross-document messaging based API that securely exchanges requests between an iframe hosting the runtime environment and one of an iframe and a page hosting a document.

11. A server for providing document communication runtime interfaces, the server comprising:
    a memory storing instructions; and
    a processor coupled to the memory, the processor executing a hosted service in conjunction with the instructions stored in the memory, wherein the processor is adapted to:
        facilitate document-centric messaging for transmitting calls supporting a script object model;
        provide security employing at least one of a policy checking mechanism over the messaging, wherein a receiving entity confirms whether a transmitting entity is allowed to transmit a call, and a sandbox process to manage extension content traffic between an application hosting a document and third party web services providing the extension content;
        provide a solution manager to determine which extensions relate to an instance of the application, a document content type, and document content, and to obtain configuration and policy information from manifest files cached on a user machine;

monitor aspects of the extensions;
stop or restart the extensions based on violations of predefined metrics;
provide a background thread in a rich client application for managing an interaction with a runtime environment by queuing requests and interacting with a foreground user interface thread; and
provide a cross-document messaging based API in a browser-based application that securely exchanges requests between an iframe hosting the runtime environment and one of an iframe and a page hosting a document.

12. The server of claim 11, wherein the browser-based application includes a requestor that is a part of a runtime environment hosted by an extension developer's iframe and a listener that is a part of a runtime environment hosted in a document container that services requestor requests.

13. The server of claim 11, wherein the browser-based application further includes a queuing system to ensure that extensions are serviced fairly.

14. The server of claim 13, wherein each extension is served by a dedicated web object control and at least one communication protocol is employed to exchange the requests.

15. A computer-readable memory device with instructions stored thereon for providing document communication runtime interfaces, the instructions comprising:
facilitating document-centric messaging for transmitting calls supporting a script object model;
providing security employing at least one of a policy checking mechanism over the messaging, wherein a receiving entity confirms whether a transmitting entity is allowed to transmit a call, and a sandbox process to manage extension content traffic between an application hosting a document and third party web services providing the extension content;
providing a solution manager to determine which extensions relate to an instance of the application, a document content type, and document content, and to obtain configuration and policy information from manifest files cached on a user machine;
monitoring aspects of the extensions;
one of stopping and restarting the extensions based on violations of predefined metrics;
providing requests through a process to a rich client application for managing an interaction with a runtime environment without impacting a user experience; and
providing a cross-document messaging based API in a browser-based application that securely exchanges requests between an iframe hosting the runtime environment and one of an iframe and a page hosting a document.

16. The computer-readable memory device of claim 15, wherein the sandbox is an object in a host process marshaled via a proxy into a browser application facilitating calls from the browser application to the host process.

17. The computer-readable memory device of claim 15, wherein the instructions further comprise:
achieving persistence through a per extension instantiation property group containing instance specific state that is persisted in line with the document.

18. The computer-readable memory device of claim 15, wherein the instructions further comprise:
providing a host integration manager that includes code specific to each application mapping application capabilities to the sandbox process; and
providing a context manager and an activation manager to bridge solutions to host data and to manage each extension's context, wherein the solutions include solving a problem of the communication runtime interface.

* * * * *